United States Patent [19]

Okuyama

[11] 4,241,894
[45] Dec. 30, 1980

[54] SEAT SUSPENSION APPARATUS

[75] Inventor: Teiji Okuyama, Toyota, Japan

[73] Assignee: Aisin Seiki Kabushiki Kaisha, Kariya, Japan

[21] Appl. No.: 26,706

[22] Filed: Apr. 3, 1979

[30] Foreign Application Priority Data

Apr. 15, 1978 [JP] Japan .................................. 53-44433
Apr. 15, 1978 [JP] Japan .................................. 53-44434

[51] Int. Cl.³ ............................................ F16M 13/00
[52] U.S. Cl. .................................... 248/576; 248/593; 296/63
[58] Field of Search ............... 248/576, 577, 584, 585, 248/586, 593, 595, 596; 296/63, 64

[56] References Cited

FOREIGN PATENT DOCUMENTS

| | | | |
|---|---|---|---|
| 1808330 | 5/1970 | Fed. Rep. of Germany | 248/584 |
| 2332763 | 1/1974 | Fed. Rep. of Germany | 248/584 |
| 2532974 | 10/1977 | Fed. Rep. of Germany | 248/576 |
| 674251 | 6/1952 | United Kingdom | 248/576 |
| 1236783 | 6/1971 | United Kingdom | 296/63 |
| 1282213 | 7/1972 | United Kingdom | 296/63 |

Primary Examiner—J. Franklin Foss
Attorney, Agent, or Firm—Sughrue, Rothwell, Mion, Zinn and Macpeak

[57] ABSTRACT

A seat suspension apparatus comprises a pair of parallel link assemblies and a pair of balance springs. In order to reduce the elevation of the seating surface relative to a support base and to assure a stabilized suspension when the seating surface is depressed to a relatively low elevation, one of the parallel link assemblies is coupled with the other at a given angle therebetween. The resilience of the balance springs counteracts the load on the seat to maintain the pair of parallel link assemblies at a balanced position which depends on the magnitude of the load. The resilience can be adjusted through an eccentric cam which is operated by a lever located on one side of the seat. Thus the user can adjust the elevation of the seat by turning the lever while looking forward, avoiding the need for assuming a slouch position.

4 Claims, 12 Drawing Figures

SEAT SUSPENSION APPARATUS

BACKGROUND OF THE INVENTION

The invention relates to a seat suspension apparatus including one or more spring which produces a cushioning effect against a user, and more particularly, to such apparatus in which the resilience of the spring and the elevation of the seat are adjustable.

A seat suspension apparatus of the kind described is mounted under a driver's seat of a heavy weight road vehicle such as goods vehicles, for example. Examples of conventional seat suspension apparatus are schematically illustrated in FIGS. 1a, 1b and 1c. The arrangement shown in FIG. 1a includes a pair of frames 30, 31, pivots 32, 34 fixedly mounted on the frame 30, pivots 33, 35 fixedly mounted on the frame 31, and a pair of connecting links 36, 37 which are pivotally mounted on the pair of pivots 32, 33 and 34, 35, respectively. An arm 38 is secured to the pivot 35 and has its free end connected with one end of a spring 39, the other end of which is connected with a threaded end of a handle 41 through a rotatable fastener 40. With this seat suspension apparatus, when a load (seating weight) is applied to a seat plate 42 secured to the frame 31 in a direction indicated by a thick arrow, the links 36, 37 turn clockwise until the tension of the spring 39 is balanced with the seating load. By turning the handle 41 to change the tension of the spring 39, the links 36, 37 can be turned either counter-clockwise or clockwise to change the elevation of the seat plate 42 and to vary the degree of a cushioning effect.

In the arrangement shown in FIG. 1b, the pivot 34 is rotatably mounted on the frame 30 and is fixedly connected with the link 37, with the arm 38 being secured to the pivot 34. Again, the handle 41 is turned to change the tension of the spring 39 in order to change the elevation of the seat plate 42.

In the arrangement shown in FIG. 1c, lower frame 30 is secured to a floor and carries pivots 32, 34 which are coupled with both links 36, 37. A similar seat suspension apparatus is disclosed in British Patent Specification No. 1,208,051 (Intl. Class B 60 nl/06, Complete Specification published Oct. 7, 1974).

A common problem to these conventional seat suspension apparatus is an increased height a from the floor and an increased back-and-forth stroke b (see FIG. 1c) through which the seat must be moved. Specifically, in the arrangements shown in FIGS. 1a and 1b, the height a is necessarily greater than the spacing between the pivots 32, 34. With the arrangement of FIG. 1c, the lowermost position or the height a of the suspension must be maintained at a relatively high level since the parallelism of the seat plate 42 cannot be maintained if the latter is allowed to be lowered until all of the pivots 32, 34, 33, 35 are aligned on a line in response to the weight of a seat occupant and/or vibrations or shocks applied by the vehicle. The back-and-forth stroke b is also high because the pivot 35 follows a circular locus which is struck from the pivot 34 and the link 37 angularly moves above its horizontal position. In this manner, the increased magnitude of the height a and the back-and-forth stroke b of the suspension apparatus required an increased space margin around the driver's seat of the vehicle.

Another problem which is experienced with conventional seat suspension apparatus is the fact that a seat occupant must assume a slouched position to turn the handle which is located on the front side of the seat in order to adjust the tension of the spring. Furthermore, the handle must be turned several times in order to reach a proper elevation. It is cumbersome for the seat occupant to assume such position or to operate the handle in this manner, in particular for a driver who is forced to leave his proper seating position. Another type of seat suspension is disclosed in U.S. Pat. No. 2,357,825.

SUMMARY OF THE INVENTION

It is a first object of the invention to provide a seat suspension apparatus which provides a reduced height and a reduced back-and-forth stroke.

It is a second object of the invention to provide a seat suspension apparatus which permits an adjustment of the seating surface without departing from his normal seating position.

It is a third object of the invention to provide a seat suspension apparatus which permits an adjustment of the elevation of the seating surface with a simple lever operation.

In order to achieve above objects, in accordance with the invention, a seat suspension apparatus comprises a first and a second parallel motion assembly. The back-and-forth stroke b is minimized by allowing the first assembly to move through an extent centered about the horizontal position of the first parallel motion assembly in which its pivotal points (which are four in number) are aligned on a horizontal line. The second parallel motion assembly is interlocked with the first parallel motion assembly with a given offset angle so that the instability of the first parallel motion assembly in its horizontal position or in the vicinity thereof can be compensated for. As a result of such arrangement, when the first parallel motion assembly is in its unstable region, namely, in a horizontal position in which the pivots are substantially aligned on a line or in a region adjacent thereto, the second parallel motion assembly is in its stable region so that the suspension apparatus as a whole maintains a stable parallellism. Limiting the extent of movement of the parallel motion assembly across a horizontal position, it is possible to reduce the distance between the seat plate and the floor or the height a of the seat by allowing the links to reach the floor surface or to a position below the floor surface by providing notches or depressions therein, if required.

In a preferred embodiment of the invention, an eccentric cam is used to rock an arm to which one end of a spring is connected, thereby allowing the line of action of the spring to be changed to permit an adjustment of the load which can be supported by the seat suspension apparatus. The eccentric cam is disposed for angular movement by a rod extending alongside the seat. In this manner, operating means, preferably lever, can be secured to the rod alongside the seat to permit an adjustment of a level of the seating surface without departing from a normal seating position of the seat occupant.

Preferably, locking means is provided to constrain a free angular movement of the rod secured to the eccentric cam after a desired elevation of the seating surface has been established, in order to prevent an unintended angular movement of the rod in response to vibrations, shocks or impact of another object upon the lever.

BRIEF DESCRIPTION OF THE DRAWINGS

FIG. 2b is a perspective view of the seat suspension apparatus constructed according to a preferred embodiment of the invention, as mounted on the seat shown in FIG. 2a;

DESCRIPTION OF PREFERRED EMBODIMENT

Figure 1A:
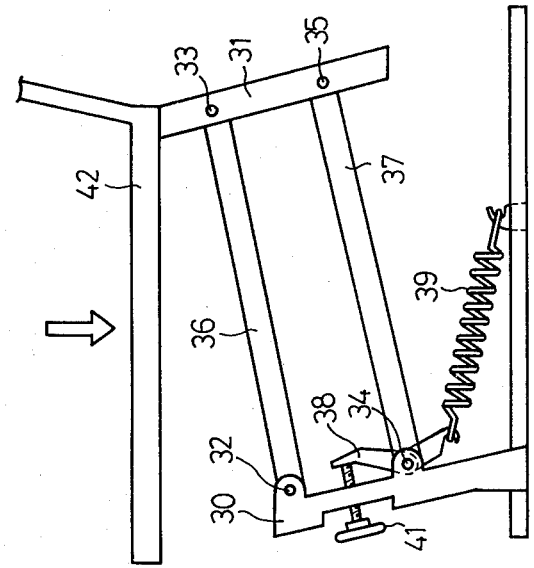
FIGS. 1a, 1b and 1c are schematic side elevations of conventional seat suspension apparatus.
Figure 1B:
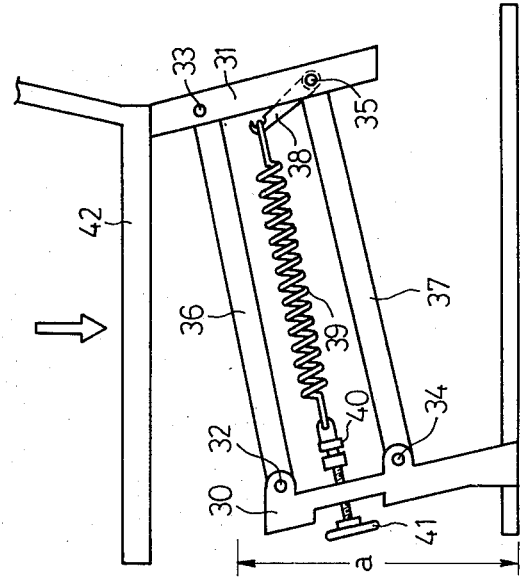
Figure 1C:
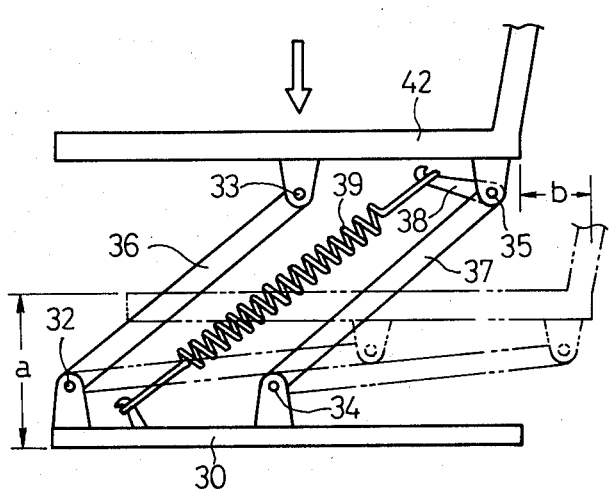
Figure 2A:
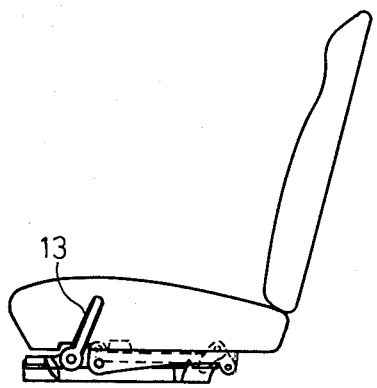
FIG. 2a is a side elevation of a seat provided with the seat suspension apparatus according to the invention.
Figure 2B:
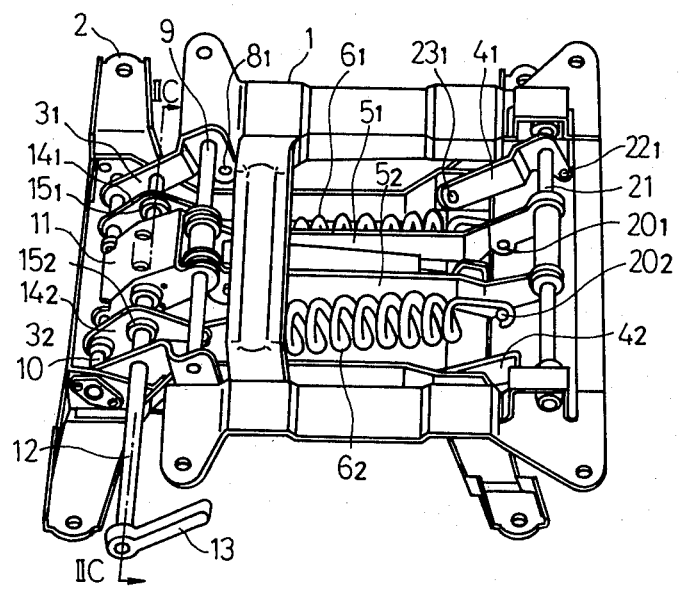

Referring to FIG. 2b, there is shown a general arrangement of the seat suspension apparatus according to a preferred embodiment of the invention. It comprises a parallel link assembly including an upper frame 1 to which a seat is secured, a lower frame 2 which is secured to a floor, a plurality of link arms $3_1$, $3_2$, $4_1$, $4_2$ and pivots 10, $8_1$, $22_1$, $23_1$, which couple the link arms with the respective frames in a manner to permit their relative movement while maintaining the parallel relationship. The link arm $3_2$ coupled with the upper frame 1 by a pivot which is located at a position corresponding to pivot $8_1$, while link arm $4_2$ is coupled with the upper and lower frames 1, 2 by pivots which are located in a manner corresponding to pivots $22_1$, $23_1$. The distance between pivots 9 and $8_1$ is equal to the distance between the pivots $21_1$ and $23_1$, and this assures that the upper frame 1 maintains a parallellism with the lower frame 2 during its movement. Another pair of connecting links $5_1$, $5_2$ are coupled with pivots 9, 21 to form a parallelogram linkage similar to the upper frame 1.

Rotatably mounted on the pivot 10 is one end of arms $14_1$, $14_2$, the other end of which is engaged by one end of springs $6_1$, $6_2$, the other ends of which are in turn anchored to pins $20_1$, $20_2$ which are secured to the connecting links $5_1$, $5_2$. Intermediate their lengths, the arms $14_1$, $14_2$ are formed with elongate slots which are engaged by eccentric cams $15_1$, $15_2$. The eccentric cams $15_1$, $15_2$ are integrally secured to a rod 12 which is rotatably carried by link arms $3_1$, $3_2$. In other words, the rod 12 represents an eccentric shaft of the cams $15_1$, $15_2$. One end of the rod 12 extends beyond the lateral side of the upper frame 1, with a lever 13 being secured to the free end thereof. A bracket 11 forms part of locking means which locks the rod 12 against rotation.

Figure 2C:
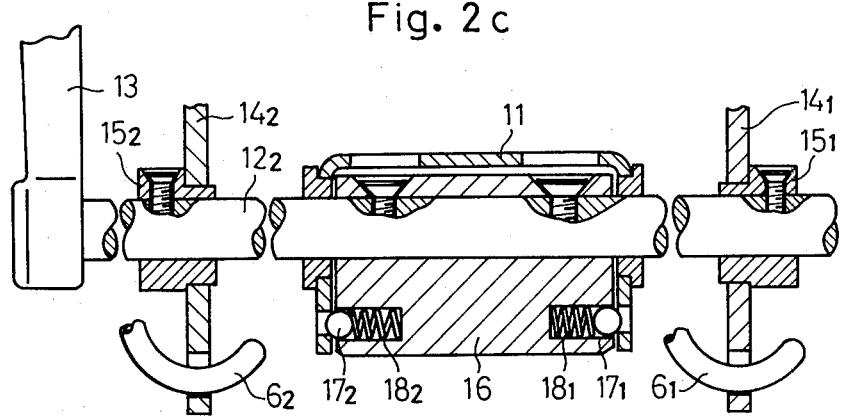
FIG. 2c is an enlarged cross section taken along the line IIC—IIC shown in FIG. 2b.
Figure 2F:
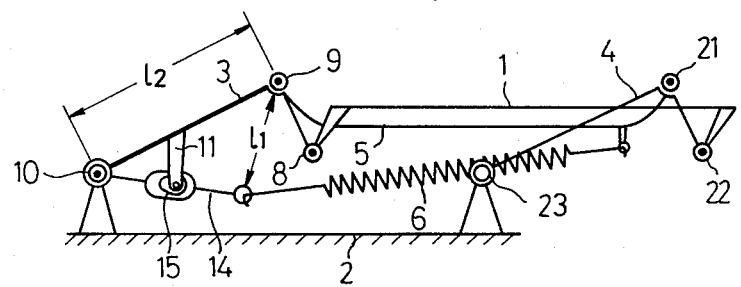
FIG. 2f is a diagrammatic side elevation of the seat suspension apparatus shown in FIG. 2b, illustrating one of its operational positions.
Figure 2D:
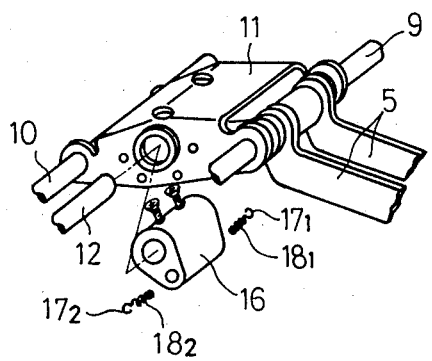
FIG. 2d is an exploded, perspective view of locking means associated with the bracket shown in FIGS. 2b and 2c.

FIG. 2c shows an enlarged cross section taken along the line IIc—IIc shown in FIG. 2b, and FIG. 2d shows an exploded perspective view of the bracket 11. Referring to these Figures to describe the arrangement of locking means associated with the bracket 11, it will be noted that the bracket 11 is channel-shaped in cross section and is rotatably coupled with the rod 12 which extends through the opposing limbs thereof. A member 16 is fixedly mounted on the rod 12 and is surrounded by the bracket 11. In its opposite end faces, the member 16 is formed with a pair of axially extending openings in which a pair of springs $18_1$, $18_2$ and balls $17_1$, $17_2$ are disposed. These springs $18_1$, $18_2$ urge the balls out of the openings, but the resulting movement is blocked by the abutment of the balls against the opposite limbs of the bracket 11. A plurality of holes are formed in the opposing limbs of the bracket 11 and are located on a circumference which is centered about the rod 12. These holes have a diameter which is less than that of the balls $17_1$, $17_2$. It will be seen that a rotation of the rod 12 is prevented when the balls $17_1$, $17_2$ are engaged with the holes formed in the bracket 11 as shown in FIG. 2c. Consequently, the rod 12 cannot be rotated unless the lever 13 is driven with an angular momentum which exceeds a given value. However, the rod 12 is free to rotate whenever balls $17_1$, $17_2$ are disengaged from the holes formed in the bracket 11. It is to be understood that the number of holes in the bracket 11 is chosen according to the number of steps to which the resilience of the spring which is imparted to the upper frame 1 should be adjusted.

Figure 2E:
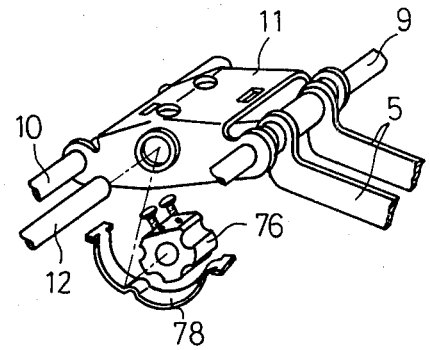
FIG. 2e is an exploded, perspective view of a modification of locking means.

FIG. 2e shows a modification of locking means in an exploded, perspective view. In this instance, a member 76 which is fixedly connected with the rod 12 is peripherally formed with a plurality of axially extending grooves, and a leaf spring 78 is connected with the bracket 11 in a manner to surround the member 76. The leaf spring 78 is formed with a radially inwardly extending tab which is adapted to engage one of the grooves. Again, the rod 12 cannot be rotated whenever the tab of the leaf spring 78 is engaged with the groove in the bracket 11 unless an angular movement in excess of a given value is applied to the lever 13.

A diagrammatical side elevation of the suspension apparatus shown in FIG. 2b is illustrated in FIG. 2f, to which reference is made to describe the operation of the apparatus. When the lever 13 is turned, the cams $15_1$, $15_2$ which engage the elongate slots in the arms $14_1$, $14_2$ rotate, whereby the ends of the arms $14_1$, $14_2$ which engage the springs $6_1$, $6_2$ move either upwardly or downwardly, thereby increasing or decreasing the distance $l_1$ between these ends and the pivot 9. Representing the distance between the pivots 9, 10 by $l_2$ and the spring load of the springs $6_1$, $6_2$ by F, a momentum of a magnitude $F \times l_1/l_2$ acts upwardly upon the upper frame 1. Since the magnitude of F and $l_2$ is constant while the magnitude of $l_1$ changes as the lever rotates, it then follows that the upward force which is applied to the upper frame 1 depends on the angular position of the lever 13. It is unnecessary that a seat occupant departs from his normal position to assume a slouched position as in the prior art practice since it is possible for him to adjust the elevation of the seating surface by turning the lever 13 in either direction while assuming his normal seating position (see FIG. 2a). Such adjustment can be simply achieved since the lever can be rotated through 180°.

Figure 3A:
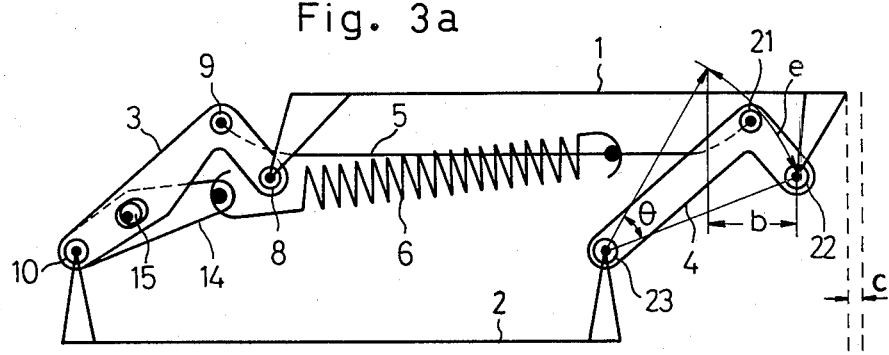
FIGS. 3a, 3b and 3c are diagrammatic side elevations of the seat suspension apparatus shown in FIG. 2b, illustrating different operative positions.
Figure 3B:
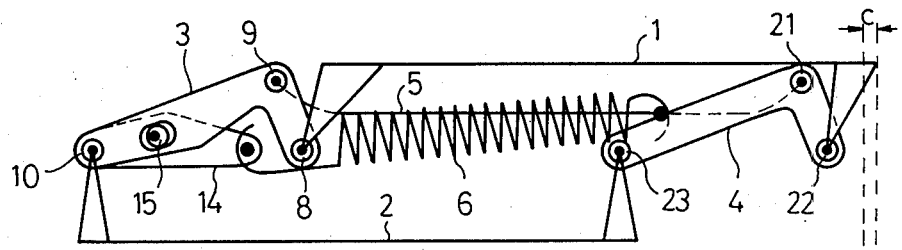
Figure 3C:
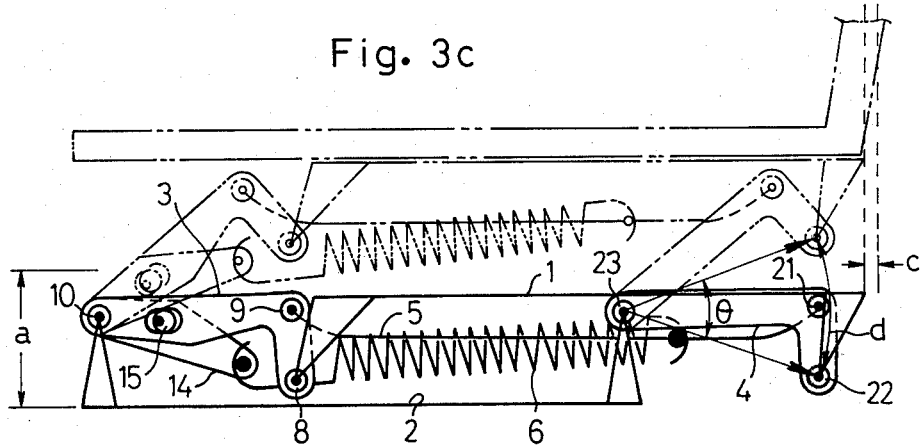

FIGS. 3a through 3c are diagrammatic side elevations of the embodiment shown in FIG. 2b, illustrating different operational positions which result in accordance with the weight of the seat occupant. These illustrations correspond to an increasing weight of the seat occupant. In FIG. 3a, the first parallel motion assembly comprising the upper frame 1, lower frame 2, links 3, 4 and pivots 8, 10, 22, 23 as well as the second parallel motion assembly comprising the connecting links 5, lower frame 2, links 3, 4 and pivots 9, 10, 21, 23 both constitute a stabilized parallelogram.

By contrast, in the operating condition illustrated in FIG. 3b, pivots 10, 8, 23 and 22 are aligned substantially on a single line, and hence the first parallel motion assembly cannot form a stabilized parallelogram, resulting in a failure to provide a stabilized support to the seat. However, the second parallel motion assembly forms a stabilized parallelogram which is offset by a given angle from the first assembly, thus providing a stable support to the seat.

In the operating condition illustrated in FIG. 3c, the first parallel motion assembly moves below the horizontal position shown in FIG. 3b, forming a stabilized parallelogram which is substantially symmetrical to that shown in FIG. 3a with respect to a line joining the pivots 10 and 23. In this manner, the seat suspension apparatus provides a stable support to the seat. In this instance, the second parallel motion assembly becomes unstable since the pivots 10, 9, 23, 21 are substantially aligned on a line. However, as mentioned previously, the stable support by the apparatus is assured by the first assembly.

A curved arrow d shown in FIG. 3c indicates an angular extent through which the pivot 22 moves as the weight on the seat varies (from FIG. 3a to FIG. 3c). This angular extent is indicated by $\theta$, and it will be seen that a line joining the pivots 10 and 23 substantially bisects this angular extent. Consequently, the back-and-forth stroke of the upper frame 1 or the seat over such angular extent is indicated by a distance c shown in FIG. 3c, which is minimal. By contrast, in a conventional seat suspension apparatus, seat is provided with a single parallel motion assembly, and a situation must be avoided in which four pivots are substantially aligned on a line as illustrated in FIG. 3b. This requires that an angular extent through which the pivot 22 moves be shifted to a range indicated by a curved arrow e shown in FIG. 3a, for example, thus greatly increasing the back-and-forth stroke b. In addition, the extent of vertical movement of the upper frame 1 is limited.

In contradistinction thereto, if the back-and-forth stroke b of a magnitude comparable to the prior art arrangement is allowed in the seat suspension apparatus, it is possible to increase the distance between the pivots 22 and 23 or the length of link arms 3, 4, so that the extent of vertical movement can be increased. In addition, assuming a weight W is applied to the upper frame 1, the approximation $W \approx F \times l_1/l_2$ indicates that an increased value of $l_2$ permits the spring load F to be reduced in inverse proportion to the magnitude of $l_2$ in order to support the same load. This means that springs $6_1$, $6_2$ of a reduced resilience may be used. Alternatively, if the springs of the same quality are used, the value of $l_1$ can be reduced, enabling a further reduction in the height of the suspension apparatus.

From the foregoing description, it will be understood that the invention has provided a seat suspension having a reduced height and which minimizes the back-and-forth stroke.

What is claimed is:

1. In a seat suspension apparatus including a first parallel motion assembly, a spring urging said assembly in a given direction, and means for adjusting the resilience of said spring which causes said assembly to move in a given direction, the improvement comprising a second parallel motion assembly having a common lower frame member with said first parallel motion assembly and which is offset at an angle with respect to said first parallel motion assembly, said first parallel motion assembly comprising a pair of spaced apart opposed link arms each having three pivot points which are located on the apices of the triangle, a lower frame member adapted to be secured to a floor, means pivotably connecting first pivot points on each link arm to opposite ends of said lower frame member, an upper frame member adapted to have a seat secured thereto, means pivotably connecting second pivot points on each of said link arms to opposite ends of said upper frame member, said second parallel motion assembly comprising said link arms, said lower frame member, a connecting link extending between said link arms and means pivotably connecting the ends of said connecting link to third pivot points on said link arms, said link arms being pivoted about said first pivot points substantially equal distances on opposite sides of a horizontal line extending through said first and second pivot points on said link arms.

2. In a seat suspension apparatus according to claim 1, wherein said adjusting means comprises an eccentric cam and an arm which is driven by said cam to change its relative position with respect to one of said link arms, one end of said spring being connected with the arm to cause a rotation of an eccentric shaft on which the eccentric cam is mounted thereby changing the line of action of the spring with respect to said link arms.

3. In a seat suspension apparatus according to claim 2, wherein said eccentric shaft comprises a rod which extends in a direction perpendicular to both the vertical movement of the parallel motion assembly and the length of the spring, said rod having a lever secured to an end thereof.

4. In a seat suspension apparatus according to claim 3, wherein said adjusting means is associated with marking means which constrains a further rotation of said rod for each angular increment of rotation of the rod.

* * * * *